United States Patent [19]

Kawamoto et al.

[11] 4,027,750

[45] June 7, 1977

[54] FLOATING DISC BRAKE INCLUDING AIR ESCAPE STRUCTURE

[75] Inventors: Kyoji Kawamoto; Yosuke Ishihara, both of Itami, Japan

[73] Assignee: Sumitomo Electric Industries, Ltd., Osaka, Japan

[22] Filed: Apr. 15, 1976

[21] Appl. No.: 677,470

[30] Foreign Application Priority Data

Apr. 18, 1975  Japan .................. 50-53301[U]

[52] U.S. Cl. .................. 188/73.3; 308/3.5; 308/238
[51] Int. Cl.² .................. F16D 55/224
[58] Field of Search .................. 188/72.4, 73.3; 308/3 R, 3.5, 237 R, 238; 403/37, 39, 268, 292, 298

[56] References Cited

UNITED STATES PATENTS

| 3,065,035 | 11/1962 | Biesecker | 303/238 X |
| 3,072,221 | 1/1963 | Peros | 188/72.4 X |

FOREIGN PATENTS OR APPLICATIONS

| 465,953 | 6/1950 | Canada | 403/298 |
| 1,354,182 | 1/1964 | France | 308/237 R |
| 1,382,046 | 1/1975 | United Kingdom | 188/73.3 |

*Primary Examiner*—George E. A. Halvosa
*Attorney, Agent, or Firm*—Sughrue, Rothwell, Mion, Zinn & Macpeak

[57] ABSTRACT

A floating disc brake is diclosed having a caliper which is guided by pins therein which slide axially within blind holes provided in a fixed member. At least one of the pins is enclosed in a resilient bag having air passages therein for permitting the compressed air in the blind hole to escape.

6 Claims, 7 Drawing Figures

FLOATING DISC BRAKE INCLUDING AIR ESCAPE STRUCTURE

BACKGROUND OF THE INVENTION

The present invention is in the field of floating disc brakes having a caliper guided by pins extending parallel to the axis of said disc.

As is well known, during operation of a floating disc brake, the caliper is guided by pins thereon, which slide in holes within a fixed member spanning the disc. In order to eliminate the intrusion of dust or other particles in the holes, they are closed at one end, i.e. they are blind holes. One disadvantage of such apparatus resides in its inability to easily exhaust air therefrom as a close fitting pin slides toward the blind end of the hole.

SUMMARY OF THE INVENTION

In accordance with the present invention the above disadvantage is eliminated by providing a floating disc brake having a caliper guided by pins, wherein the pins are covered by bags of resilient material, such as rubber, and the bags contain a groove through their length for passing air between the blind hole and the area outside said blind hole.

DETAILED DESCRIPTION

Figure 1:
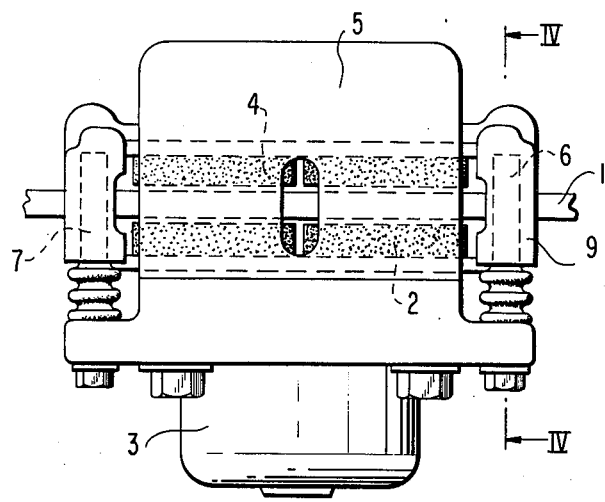
FIGS. 1, 2 and 3 are, respectively, a plan view, a front view, and a side elevational view, of a floating disc brake having guide pins on the caliper.
Figure 2:
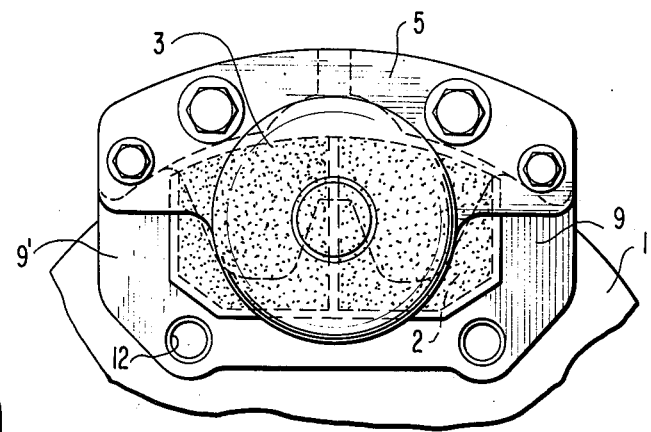
Figure 3:
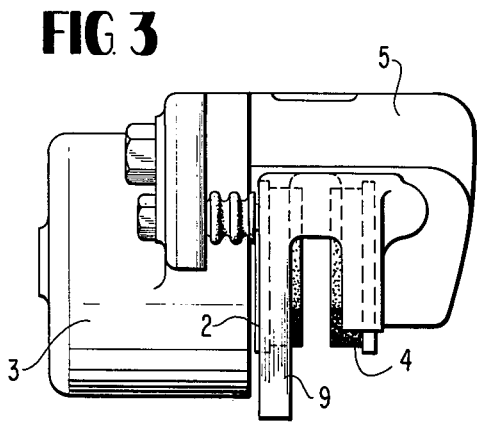

In the example shown in the drawings, particularly in FIGS. 1, 2 and 3, a fixed member 9, spanning a disc 1, essentially comprises two arms 9 and 9' forming a U-shape as viewed in FIG. 2 in the axial direction of the disc. The fixed member 9 is fixedly secured to, for instance, the knuckle of an automobile by screws (not shown) passing through screw holes 12. The two arms 9 and 9' of the fixed member are respectively extended over the periphery of the disc 1 in the axial direction of the disc. Also, as is apparent from FIG. 3, the tips of fixed member 9 are further extended downwardly in a bent manner.

Figure 4:
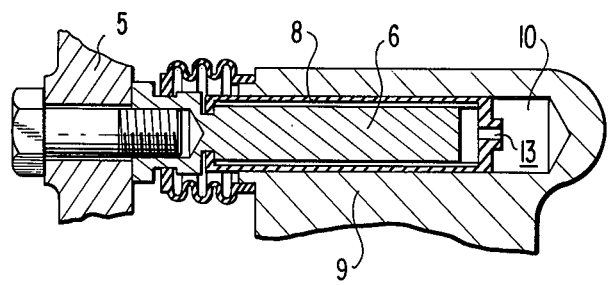
FIG. 4 is a cross sectional view, taken along line IV—IV of FIG. 1, of the arrangement of a guide pin in a blind hole.
Figure 5:
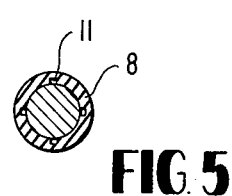
FIG. 5 is a cross sectional view illustrating the resilient bag surrounding the guide pin.
Figure 6:
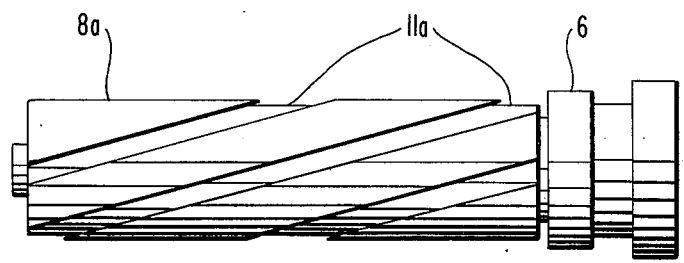
FIG. 6 is a side view of a pin illustrating a resilient bag having helical grooves on the outside thereof.
Figure 7:
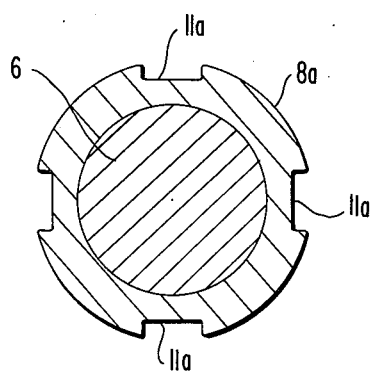
FIG. 7 is a cross-sectional view of FIG. 6.

In FIG. 4, there is indicated in a section on a much enlarged scale a part of the fixed member 9 which extends over the periphery of the disc. As is apparent in this figure, a blind hole 10 is provided in the fixed member 9, and pin 6 is inserted in the blind hole 10 with a bag 8 covering the pin. The relationship between pin 7, on the other side of the apparatus as viewed in FIG. 1, and a blind hole in arm 9', is the same as that described for pin 6 and arm 9. An air passage hole 13 is provided through the bottom wall of the bag 8. Furthermore, four longitudinal grooves 11, shown in FIG. 5, are provided in the internal surface of the bag 8 to extend the entire length of the bag. The air passage and grooves permit the air compressed at the bottom of the blind hole 10 to be exhausted to the outer atmosphere when the pin is inserted therein. Conversely, the grooves 11 may be provided on the outer surface of the bag 8, and such a procedure will render the bag easier to manufacture. Alternatively, the grooves 11 may also be provided to extend helically over the entire surface of the bag thereby to provide a retracting force for the pin due to the resilience of the helical threads thus provided. Both latter features are illustrated in FIGS. 6 and 7. As shown there the bag 8a has helical grooves 11a which are on the outside of the bag. The pins 6 and 7 are fixed to a caliper 5 by means of screws, one of which is shown in FIG. 4.

In the above described example, a pressing device 3, comprising a piston and a cylinder, is provided inside one side part of a caliper 5. On the disc-side of the piston there is provided an inner pad 2 which is moved to the right, as shown in FIG. 3, when the brake actuates the piston. On the other side part of the caliper 5, an outer pad 4 is secured. When the pressing device 3 operates to depress the inner pad 2 toward the disc 1, the reactive force causes the entire caliper 5 to move toward the left as viewed in FIG. 3, whereby the outer pad 4 is also pressed toward the disc. The above described movement of the caliper retracts the pins 6 and 7 from the respective blind holes in the fixed member.

To meet the requirements of this operation, a high precision of fabrication is demanded with respect to the space between the two blind holes 10 and the pins 6, 7 respectively, as well as regarding their cross sectional area and parallelism. However, it is preferable that one of the pins is not covered with a bag but is placed directly in the blind hole to slide therein while a clearance is provided in the space between the other pin and the blind hole where the bag 8 is interposed.

What is claimed is:

1. In a floating disc brake of the type having, a fixed member spanning said disc, a piston and a first pad positioned on one side of said disc, a caliper spanning said disc and a second pad on the other side of said disc, said caliper, piston and pads being arranged to press both pads in a direction towards said disc when said piston operates, a pair of guide pins fixed to said caliper and extending parallel to the axis of said disc and a pair of corresponding blind holes in said fixed member for slidably receiving said pins, each said blind hole having a receiving end and a blind end, the improvement comprising, at least one of said pins being enclosed in a resilient bag movable therewith, said bag having a groove therein providing an air passageway between said blind end of said blind hole and the space external to said blind hole during normal operation.

2. A floating disc brake as claimed in claim 1 wherein said bag has a hole therein at a point nearest said blind end of said blind hole, and said groove is on the internal side of said bag.

3. A floating disc brake as claimed in claim 1 wherein said groove is on the external side of said bag.

4. A floating disc brake as claimed in claim 1 wherein only one of said pins is enclosed in a resilient bag.

5. A floating disc brake as claimed in claim 1 wherein both said pins are enclosed in resilient bags.

6. A floating disc brake as claimed in claim 1 wherein said groove is a helical groove provided on the entire surface of said bag.

* * * * *